(12) United States Patent
Hsu et al.

(10) Patent No.: US 8,270,743 B2
(45) Date of Patent: Sep. 18, 2012

(54) DISCRETE COSINE PROCESSING CIRCUIT AND IMAGE PROCESSING DEVICE UTILIZING THE SAME

(75) Inventors: Ming-Chung Hsu, Taipei Hsien (TW); Yi-Shin Li, Taipei Hsien (TW); Yi-Shin Tung, Taipei Hsien (TW); Chia-Ying Li, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 662 days.

(21) Appl. No.: 12/551,668

(22) Filed: Sep. 1, 2009

(65) Prior Publication Data

US 2011/0026846 A1 Feb. 3, 2011

(30) Foreign Application Priority Data

Jul. 31, 2009 (CN) .......................... 2009 1 0305096

(51) Int. Cl.
  *G06K 9/36* (2006.01)

(52) U.S. Cl. ....................................... 382/250; 382/233

(58) Field of Classification Search .......... 382/232–234, 382/247–248, 250; 375/240.02, 240.07, 375/240.18; 708/209, 400, 402

See application file for complete search history.

(56) References Cited

U.S. PATENT DOCUMENTS

| 5,764,553 | A * | 6/1998 | Hong | 382/250 |
| 6,445,829 | B1 * | 9/2002 | Shyu | 382/250 |
| 6,584,156 | B1 * | 6/2003 | Gu et al. | 382/233 |
| 2006/0280374 | A1 | 12/2006 | Hsiun | |

* cited by examiner

*Primary Examiner* — Duy M Dang
(74) *Attorney, Agent, or Firm* — Altis Law Group, Inc.

(57) ABSTRACT

A discrete cosine transformation circuit comprising a pipeline with a memory stage and an arithmetic stage. The arithmetic stage comprises first and second arithmetic logic units (ALU). Each of the ALUs receives from the memory a set of image data, performs a first calculation on the set of image data and outputs calculation result thereof in a first clock cycle. A path in the circuit directs the result to the memory stage, such that at least one ALU can selectively receive the result from the path in a clock cycle subsequent to the first clock cycle.

17 Claims, 17 Drawing Sheets

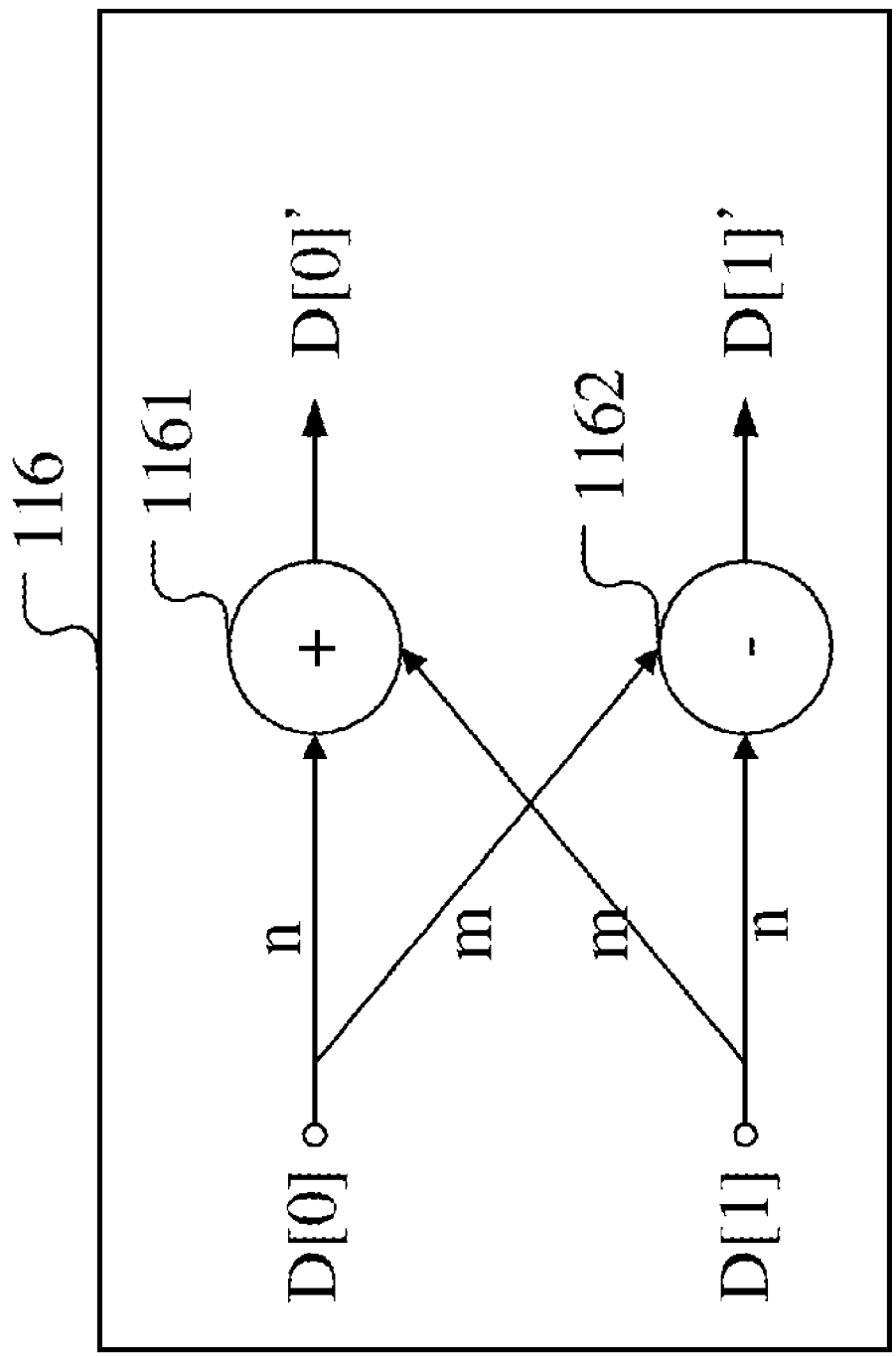

DISCRETE COSINE PROCESSING CIRCUIT AND IMAGE PROCESSING DEVICE UTILIZING THE SAME

BACKGROUND

1. Technical Field

The disclosure relates to a technique of discrete cosine transformation (DCT), and more particularly to a discrete cosine transformation circuit for performing two-dimensional discrete cosine transformations.

2. Description of Related Art

DCT is known as a transformation method suitable for image data compression. Forward DCT is execution of DCT in the forward direction for transforming image data into frequency components, and an inverse DCT (IDCT) is execution of DCT in the backward direction for recovering the original image data by inversely transforming the frequency components. The term DCT can refer to either forward DCT, inverse DCT, or both forward and inverse DCTs.

Typically, a discrete cosine transform (DCT) apparatus performs a full two-dimensional (2D) transformation on a macroblock, for example, an 8×8 pixel block, by first performing a 1D DCT on the rows of the 8×8 pixel block, then performing another 1D DCT on the columns of the 8×8 pixel block. Block-based transformations are widely utilized in different video coding standards, such as H.264, VC-1, and MPEG2, and may differ at least in their block sizes and coefficients. Dedicated DCT circuits may be designed for different video coding schemes. Integrating such dedicated circuits into one device makes the device supportive to multiple video coding schemes but may complicate circuit design and render circuit miniaturization more difficult. This is also inflexible when the device is required to accommodate new video coding schemes. Running different video coding schemes on a general-purpose processor is more flexible but inefficient.

BRIEF DESCRIPTION OF THE DRAWINGS

FIGS. 9A-9E are schematic diagrams showing embodiments of butterfly units; and

DETAILED DESCRIPTION

Description of exemplary embodiments of a discrete cosine transformation (DCT) circuit and an image processing device utilizing the same is given in the following and organized as:

1. System Overview
   1.1 Exemplary Image Processing Device
   1.2 Exemplary DCT circuit
2. Exemplary Butterfly Scheme:
   2.1 Exemplary Butterfly-Structured-Based Method
   2.2 Exemplary Butterfly Unit
3. Exemplary Operation of DCT Circuits:
   3.1 The j-th clock cycle:
   3.1.1 In the fetch stage
   3.2 The (j+1)-th clock cycle:
   3.2.1 In the memory stage
   3.2.2 In the fetch stage
   3.3 The (j+2)-th clock cycle:
   3.3.1 In the arithmetic stage
   3.3.2 In the memory stage
   3.3.3 In the fetch stage
   3.4 The (j+3)-th clock cycle:
   3.4.1 In the arithmetic stage
   3.4.2 In the memory stage
   3.4.3 In the fetch stage
   3.5 The (j+4)-th clock cycle:
   3.5.1 In the arithmetic stage
4. Variations
5. Conclusion

1. System Overview

Figure 1A:
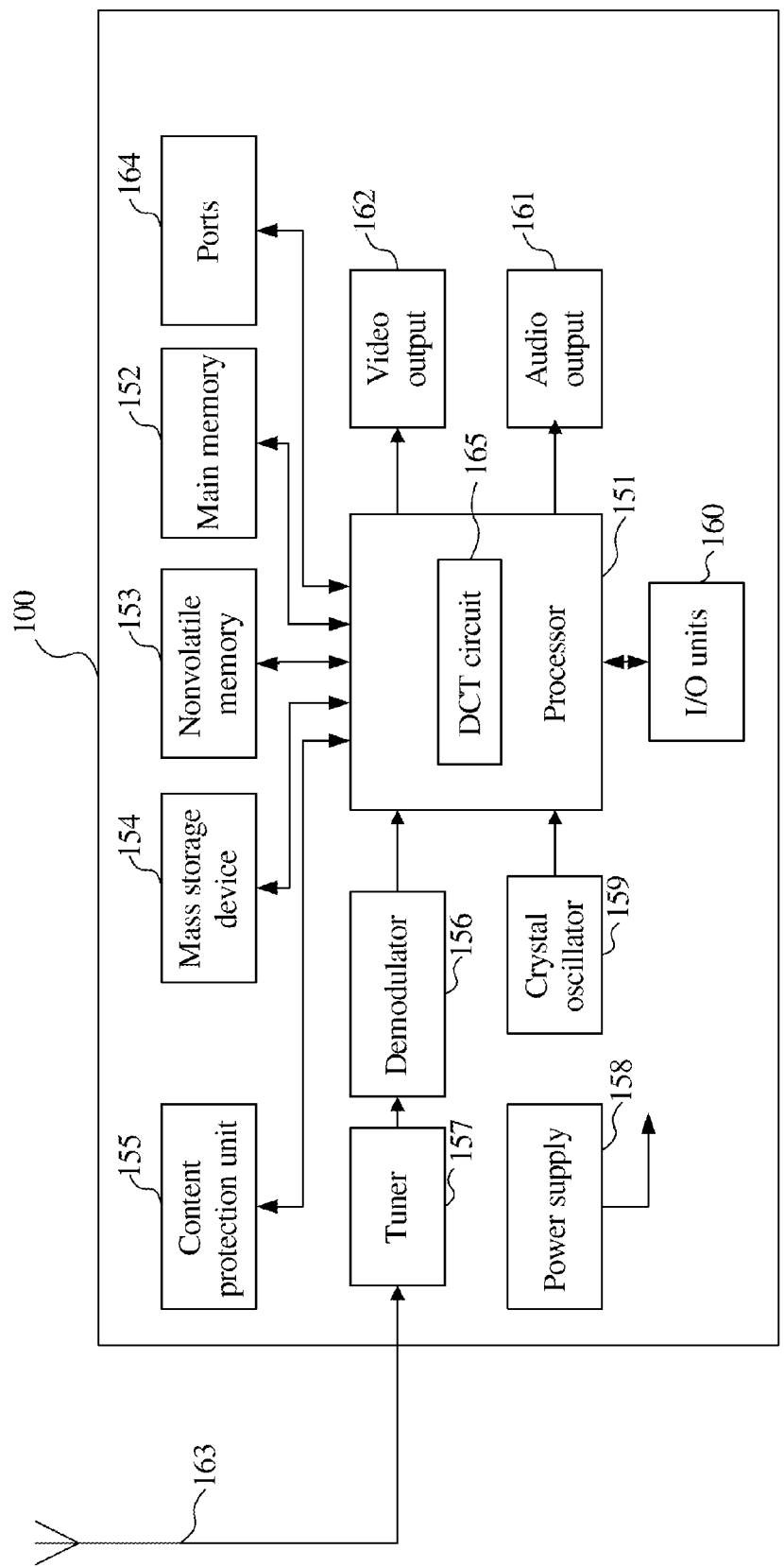
FIG. 1A is a block diagram of an embodiment of an image processing device 100 comprising a DCT circuit 165.

The discrete cosine transformation (DCT) circuit disclosed can be implemented in various image processing devices, such as a disc player, a digital camera, a set top box, or any other devices equipped with image processing capabilities. Devices integrated with image processing capabilities may comprise televisions, cell phones, and video conference devices. FIG. 1A is a block diagram of an embodiment of an image processing device 100 comprising a DCT circuit 165.

1.1 Exemplary Image Processing Device

Figure 1B:
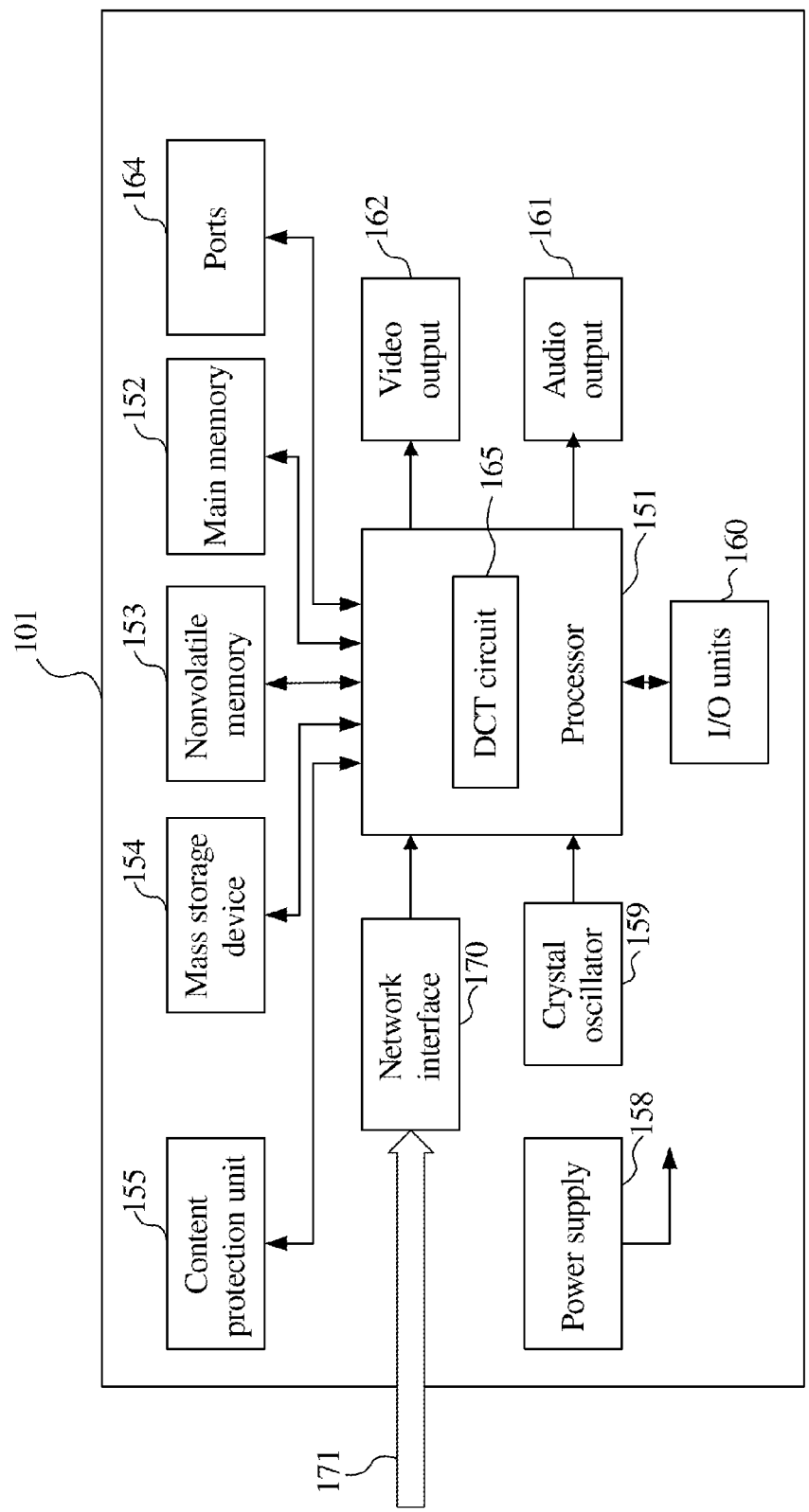
FIG. 1B shows a second embodiment of an image processing device receiving digital content from a network.

The DCT circuit 165 is integrated in a processor 151, which may comprise a central processing unit of the image processing device 100. The processor 151 may be packaged as one chip or a plurality of chips. A power supply 158 provides electrical power to components of the device 100. A crystal oscillator 159 provides clock signals to the processor 151 and other components of the device 100. Connection of the components in the device 100 is shown in FIG. 1A and may comprise serial or parallel transmission buses. Input and output (I/O) units 160 may comprise control buttons, a seven-segment display, and an infrared receiver or transceiver for communication with a remote control. Ports 164 may be used to connect to various computerized interfaces, such as an external computer for debugging the device 100. The ports 164 may comprise physical ports complying with recommended standard 232 (RS-232) and/or recommended standard 11 (RS-11) defined by Electronics Industries Association (EIA), serial ATA (STATA), and/or high-definition multimedia interface (HDMI). Nonvolatile memory 153 stores an operating system and applications executable by the processor 151. The processor 151 may load runtime processes and data to the main memory 152 and store digital content in a mass storage device 154. The main memory 152 may comprise a random access memory (RAM), such as static RAM (SRAM) or dynamic RAM (DRAM). The nonvolatile memory 153 may comprise an electrically erasable programmable read-only memory (EEPROM) or a flash memory, such as a NOR flash or a NAND flash. A content protection system 155 provides access control to digital content reproduced by the device 100. The content protection system 155 may comprise memory and necessary devices for implementing digital video broadcasting-common interface (DVB-CI) and/or conditional access (CA). The device 100 may obtain digital content from broadcast signals through an antenna 165, tuner 157, and a demodulator 156. FIG. 1B shows a second embodiment of an image processing device 101 that obtains digital content from an information network, such as the Internet, through a network interface. A video output unit 162 comprises filters and amplifiers for filtering and amplifying video signals output by the processor 151. An audio output unit comprises a digital to analog converter converting audio signals output by the processor 151 from analog format to digital format.

1.2 Exemplary DCT Circuit

Figure 2:
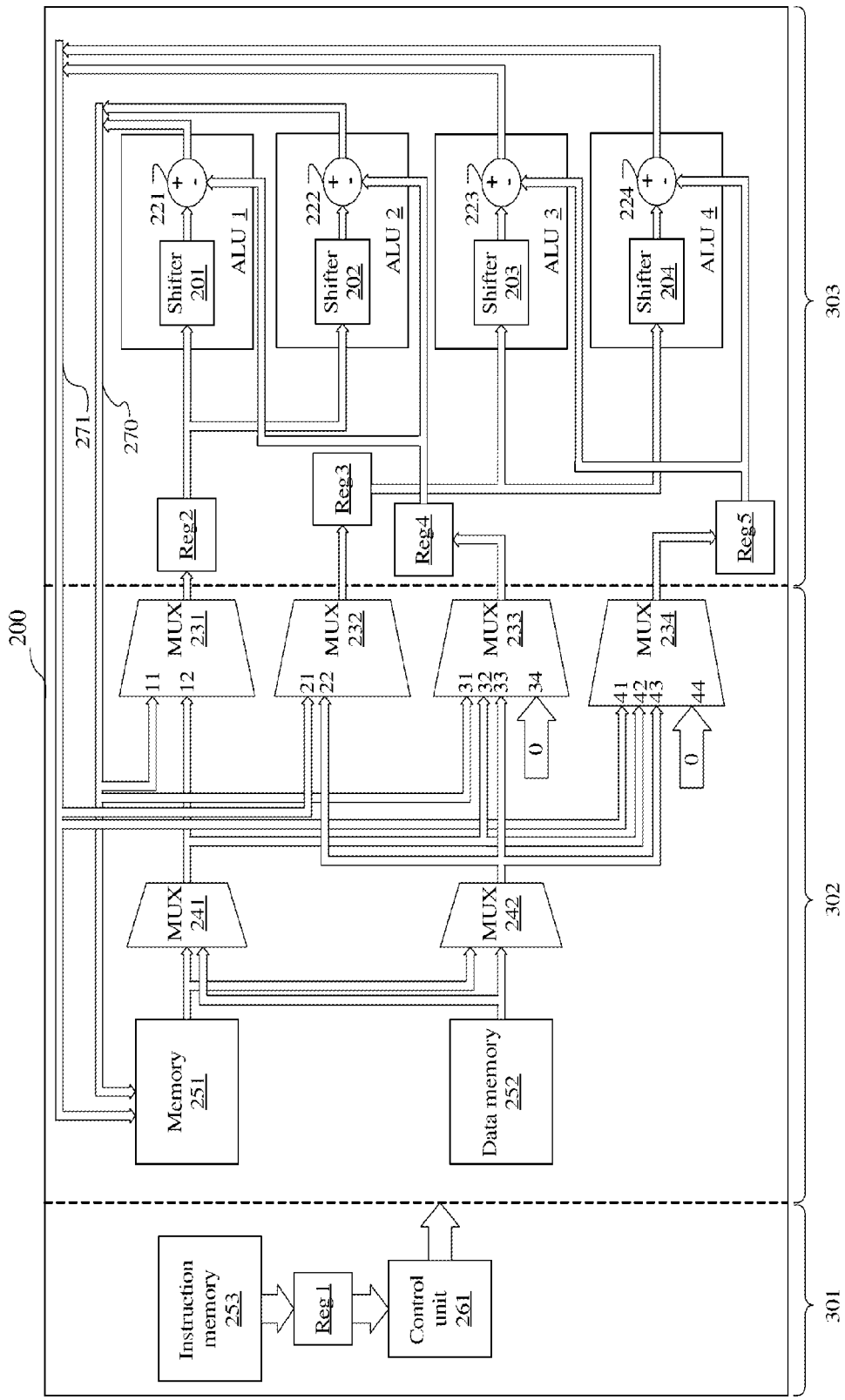
FIG. 2 is a block diagram of an exemplary embodiment of a DCT circuit.

FIG. 2 is a block diagram of an embodiment of a DCT circuit 200. The DCT circuit 200 is an exemplary embodiment of the DCT circuit 165 in FIGS. 1A and/or 1B. The DCT circuit 200 comprises a butterfly circuit for performing butterfly-structure-based methods as detailed in the following. The butterfly circuit is designed in a pipeline architecture comprising three stages: a fetch stage 301, a memory stage 302, and an arithmetic stage 303. As shown in FIG. 2, components of the DCT circuit 200 are connected through buses. An instruction memory 253 stores instructions for performing DCT. A register Reg1 stores instructions read from the instruction memory 253. The fetch stage 301 receives and decodes butterfly instructions from the register Reg1 in one clock cycle (referred to as a first clock cycle), and controls the stages 302 and 303 accordingly in subsequent clock cycles. Control lines from stage 301 to respective units in stages 302 and 303 are not shown in the drawings.

The memory stage 302 comprises a data memory 252 serving as a memory repository for image data coefficients, and a memory 251 for storing calculated intermediate data output by the arithmetic stage 303. According to decoded instructions, sets of data are read from the data memory 252 and memory 251 and routed by multiplexers (MUXes) 241, 242 and 231-234 to the outputs of the MUXes 231-234 in another clock cycle (referred to as a second clock cycle). A bus connects the output of each of the MUXes 231-234 in the stage 302 to a corresponding register of Reg2~Reg5 in the stage 303.

The arithmetic stage 303 comprises four registers Reg2-Reg5 and four arithmetic logic units (ALUs) 1-4. Each of the four registers Reg2-Reg5 receives a set of data from a corresponding MUXes 231-234 and outputs the received set of data to corresponding ALUs as input data of the ALUs. A corresponding MUX, ALU, or any other entity for a register is a MUX, ALU, or entity MUX connected to the register. The ALUs 1-4 respectively perform the same or different calculations on received sets of input data, and output result of the calculations in one clock cycle (referred to as a third clock cycle) according to at least one decoded instruction. Each ALU, such as ALU 1, comprises a shifter, such as shifter 201, for performing arithmetic shift and an adder/subtractor, such as adder/subtractor 221, for adding and subtracting.

The memories 251 and 252 may each comprise one or more memory blocks or chips. The registers Reg1-Reg5 may comprise edge-triggered flip-flops, such as D flip-flops.

The DCT circuit 200 further comprises paths 270 and 271 for directing the calculation results of the arithmetic stage 303 to the memory stage 302 in the same clock cycle when said calculations are performed. The calculation results are provided as optional inputs of the MUXes 231-234. The registers Reg2-Reg5 may, according to decoded instructions, selectively receive the calculation results from the paths 270 and 271 through the MUXes 231-234 in a clock cycle subsequent to the third clock cycle. For example, the MUX 233 comprises an optional input 31 connected to the path 270, optional inputs 32 and 33 respectively connected to the memory 251 and 252 through the MUXes 241 and 242, and an optional input 34 for receiving binary zero, such as 52 bits of binary zero according to bus bandwidth and ALU design. According to decoded instructions, the MUX 233 can output to the register Reg4 the calculation results by selecting the input 31, a subsequent set of data from the memory 251 or 252 by selecting the input 32 or 33, the 52 bits binary 0 by selecting the input 34. As shown in FIG. 2, an input 44 of MUX 234 can also receive 52 bits binary 0.

2. Exemplary Butterfly Scheme:

2.1 Exemplary Butterfly-Structured-Based Method

The image processing device 200 decodes and displays digitized still picture or video clips. A digitized picture is typically represented as a matrix of picture elements referred to as pixels. Each pixel is represented by three primary component numbers. In the YCbCr color system, the three components comprise a luma component Y and two chroma components Cb and Cr. The luma number and two chrominance numbers describe the brightness and the color of the pixel. The image processing device 200 may process images in other color systems, such as the red-green-blue (RGB) color system. Thus, each digitized picture is initially represented by three rectangular arrays, each comprising one of three primary component values of the picture.

A macroblock is a spatial sampling grid of an image, which may be defined as a 4 pixel by 4 pixel block, 4 pixel by 8 pixel block, 8 pixel by 8 pixel block, 16 pixel by 16 pixel block, or a block in any other size and form. As color information (such as one primary component in YCbCr color system) of each pixel in a macroblock of an image is arranged as an image data coefficient matrix, assumption is given that a DCT maps a length-N vector x into a new vector X of coefficients by linear transformation X=Hx, where H is a matrix, and x may be a row or a column of the image data coefficient matrix. DCT transforms image data coefficient matrix from the spatial domain to the frequency domain. In the following, the image data coefficient matrix is represented as an array with a two-dimensional index. When an element of a matrix F is represented as F[i][j] in which [i] and [j] are indices, and i and j are integer variable, the first (left-most) index [i] is the vertical index and the second (right-most) index [j] is the horizontal component of the matrix F. For example, entry F[3][5] in the matrix F would denote the entry at vertical position 3 and horizontal position 5.

DCT in image processing comprises ID column and row transform on image data coefficient matrices. Either of the ID column or row transform is defined as a sequence of product computation of plural matrices, which substantially complicate circuit design. Butterfly-structure-based methods (referred to as butterfly computation hereinafter) are very suitable for realizing the DCT without matrix multiplication circuits while mathematically equivalent to the product computation of matrices. Various image or video compression specifications may define different butterfly computations. For example, International Telecommunications Union (ITU) standard H.264, also known as MPEG-4 Part 10, or MPEG-4 Advanced Video Coding (AVC), utilize DCT formula X=H x, where:

$$H = \begin{bmatrix} 1 & 1 & 1 & 1 \\ 2 & 1 & -1 & -2 \\ 1 & -1 & -1 & 1 \\ 1 & -2 & 2 & -1 \end{bmatrix} \tag{0}$$

Figure 3:
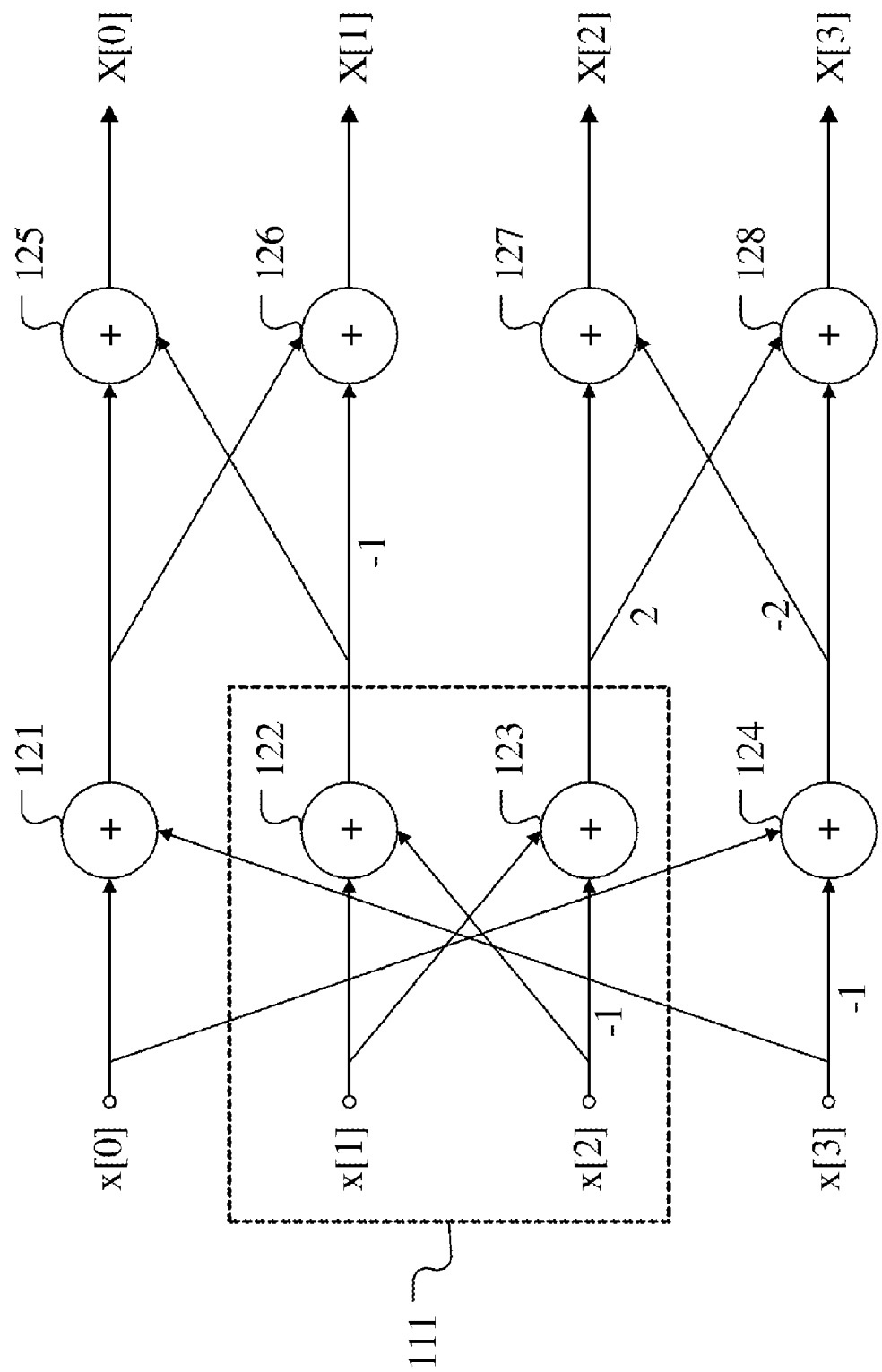
FIG. 3 is a schematic diagram showing a butterfly-structure-based method.

FIG. 3 shows a butterfly-structure-based method corresponding to the DCT formula. (0). FIG. 3 comprises four input nodes represented by values x[0], x[1], x[2] and x[3], four output nodes represented by values X[0], X[1], X[2] and X[3], and eight operation nodes 121-128 each with plus symbols "+". The plus symbol "+" in a node indicates that the node performs addition. Nodes in FIG. 3 are connected by directed transition lines reflecting operation flows. The method transfers the output value of each node along a line connected therefrom to a subsequent node to which the line is connected. A constant number, such as −1, 2, or −2, adjacent to a line is a multiplier to be multiplied with a value transferred along the line. Inputs x[0], x[1], x[2] and x[3] may be substituted by elements in a row or a column vector of a image data coefficient matrix.

A basic element in the butterfly-structure-based method may be referred to as a butterfly unit in the following, such as a butterfly unit 111. A butterfly unit comprises two input nodes and two output nodes. For example, the butterfly unit 111 comprises two input nodes represented by values x[1] and x[2] and two operation nodes 122 and 123 as the output nodes. The method enters values x[1] and x[2] of the input nodes along transition lines connected therefrom to nodes 122 and 123. The nodes 122 and 123 are respectively two additions, each of which has two inputs. The node 122 applies addition on inputs x[1] and x[2] and yields output x[1]+x[2]. The node 123 applies addition on inputs x[1] and (−1×x[2]) and yields output x[1]+(−1×x[2]), where multiplicand x[2] is multiplied by the constant multiplier −1 shown in butterfly unit 111 before entering the node 123. The multiplier is represented as a number beside a line in FIG. 3. The node x[0], x[3], 122, and 124 forms another butterfly unit. The nodes 121, 122, 125, and 126 form another butterfly unit. The outputs of nodes 122 and 123 are transferred along directed line to nodes 125-128. When all butterfly units in the FIG. 3 are executed according to the previously description, operation of the method of the FIG. 3 is finished. Other portions of FIG. 3 may be similarly applied.

The DCT circuit 200 in FIG. 2 is designed to realize various butterfly-structure-based methods. Exemplary operations of a DCT circuit carrying out computation corresponding to a butterfly unit are shown in the following.

2.2 Exemplary Butterfly Unit

Figure 4:
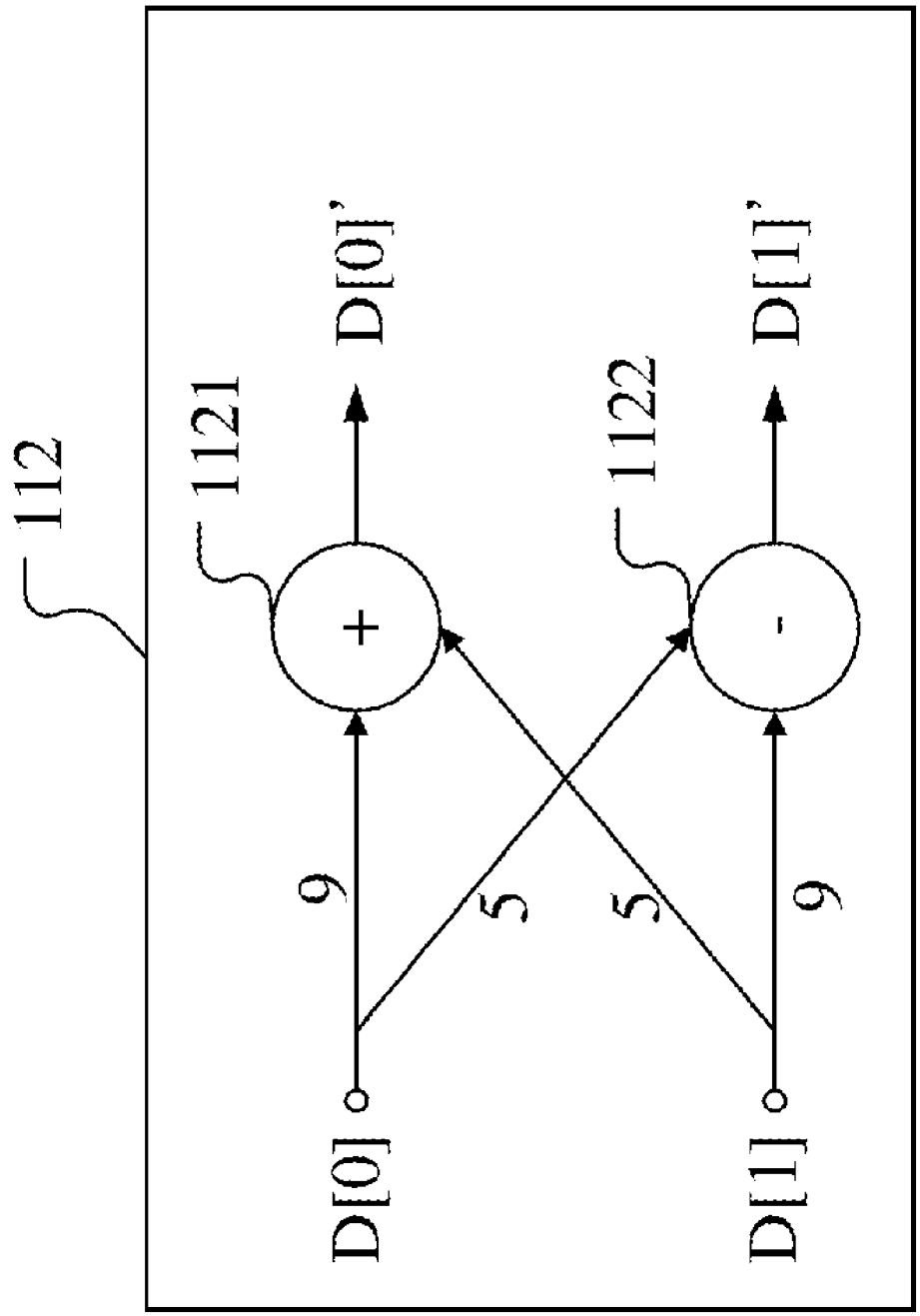
FIG. 4 is a schematic diagram showing a unit in a butterfly-structure-based method.

The control unit 261 retrieves and decodes butterfly instructions from the memory 253, and controls operations of the DCT circuit 200 according to the decoded butterfly instructions, thus to realize a butterfly unit in a butterfly-structure-based method. An example of the operation of the DCT circuit 200 is:

With reference to FIG. 4, a butterfly unit 112 represents:

$$D[0]'=D[0]\times 9+D[1]\times 5 \qquad (1)$$

$$D[1]'=D[0]\times 5-D[1]\times 9 \qquad (2)$$

The DCT circuit comprises barrel shifters for performing arithmetic bit shift. In the following, for a real number variable x and a positive integer variable y, notation x>>y represents arithmetic right shift of a two's complement integer representation of x by y binary digits. Each bit shifted into the most significant bit (MSB) as a result of the right shift shall have a value equal to the MSB of x prior to the shift operation. Conversely, notation x<<y represents arithmetic left shift of a two's complement integer representation of x by y binary digits. Each bit shifted into the least significant bit (LSB) as a result of the left shift has a value equal to 0. When shift operation is utilized to realize multiplication, formulae (1) and (2) can be derived as:

$$\begin{aligned}D[0]' &= D[0]\times 9+D[1]\times 5 \\ &= D[0]\times(8+1)+D[1]\times(4+1) \\ &= (D[0]\times 8+D[0]\times 1)+(D[1]\times 4+D[1]\times 1) \\ &= (D[0]\times 23+D[0])+(D[1]\times 22+D[1]) \\ &= (D[0]\ll 3+D[0])+(D[1]\ll 2+D[1])\end{aligned} \qquad (3)$$

$$\begin{aligned}D[1]' &= D[0]\times 5-D[1]\times 9 \\ &= D[0]\times(4-1)-D[1]\times(8+1) \\ &= (D[0]\times 4+D[0]\times 1)-(D[1]\times 8+D[1]\times 1) \\ &= (D[0]\times 22+D[0])-(D[1]\times 23+D[1]) \\ &= (D[0]\ll 2+D[0])-(D[1]\ll 3+D[1])\end{aligned} \qquad (4)$$

Assumption is given that an image data coefficient 2×2 matrix C is retrieved for ID row transform, wherein:

$$C = \begin{bmatrix} a & c \\ b & d \end{bmatrix},$$

a, b, c, and d are real numbers.

When ID row transform of the 2×2 matrix C is executed using the butterfly unit 112, elements of each row vector of the matrix C are respectively substituted for D[0] and D[1] in the butterfly unit 112. Accordingly, elements C[0][0] and C[0][1] of first row vector of the matrix C are respectively substituted for D[0] and D[1] in formulae (1) and (2), and subsequently, C[1][0] and C[1][1] of second row vector are respectively substituted for D[0] and D[1] in formulae (1) and (2). An exemplary output 2×2 matrix C' is the result of the ID row transform of the 2×2 matrix C using butterfly unit 112, where:

$$C' = \begin{bmatrix} a' & c' \\ b' & d' \end{bmatrix},$$

and $$C'[0][0]=a'=C[0][0]\times 9+C[0][1]\times 5, \qquad (5)$$

$$C'[0][1]=c'=C[1][0]\times 9+C[1][1]\times 5, \qquad (6)$$

$$C'[1][0]=b'=C[0][0]\times 5-C[0][1]\times 9, \qquad (7)$$

$$C'[1][1]=d'=C[1][0]\times 5-C[1][1]\times 9. \qquad (8)$$

Another image data coefficient 2×2 matrix Y is given for anther example of ID column transform, where:

$$Y = \begin{bmatrix} e & g \\ f & h \end{bmatrix},$$

e, f, g, and h are real numbers.

When ID column transform of a 2×2 matrix Y is executed using the butterfly unit 112, elements of each column vector of the matrix Y are respectively substituted for D[0] and D[1] in the butterfly unit 112. Accordingly, element Y[0][0] and Y[1][0] of first column vector are respectively substituted for D[0] and D[1] in formulae (1) and (2), and subsequently, Y[0][1] and Y[1][1] are respectively substituted for D[0] and D[1] in formulae (1) and (2). An exemplary output 2×2 matrix Y' is the result of the ID column transform of a 2×2 matrix Y using the butterfly unit 112, wherein:

$$Y' = \begin{bmatrix} e' & g' \\ f' & h' \end{bmatrix},$$

and $$Y'[0][0]=e'=Y[0][0]\times 9+Y[1][0]\times 5, \tag{5a}$$

$$Y'[0][1]=g'=Y[0][0]\times 5-Y[1][0]\times 9, \tag{6a}$$

$$Y'[1][0]=f'=Y[0][1]\times 9+Y[1][1]\times 5, \tag{7a}$$

$$Y'[1][1]=h'=Y[0][1]\times 5-Y[1][1]\times 9. \tag{8a}$$

2D DCT corresponding to the butterfly unit 112 of the matrix Y can be finished by performing formulae 5a, 6a, 7a, and 8a with the matrix C' substituting for the matrix Y.

3. Exemplary Operation of DCT Circuits:

As previously described, the butterfly unit 112 can be represented by formulae (3) and (4). The DCT circuit 200 may execute formulae (3) and (4) to implement the butterfly unit 112. Thus, the image processing device 100 comprises at least three instructions for implementing the butterfly unit 112. The first butterfly instruction directs the DCT circuit to perform (D[1]<<2+D[1]) in formula (3) and (D[0]<<2+D[0]) in formula (4). That is, the first butterfly instruction is to realize:

$$t1=(D[1]<<2+D[1]); \text{ and} \tag{9}$$

$$t2=(D[0]<<2+D[0]). \tag{10}$$

Assumption is given that t1 and t2 are variable, which may or may not be implemented by any register. The formula (9) is equivalent to a transition line in the butterfly unit 112 from D[1] to the node 1121. The formula (10) is equivalent to a transition line in the butterfly unit 112 from D[0] to the node 1122.

The second butterfly instruction directs the DCT circuit 200 to perform (D[0]<<3+D[0]) in formula (3) and (D[1]<<3+D[1]) in formula (4). That is, the second butterfly instruction is to realize:

$$t3=(D[0]<<3+D[0]); \text{ and} \tag{11}$$

$$t4=(D[1]<<3+D[1]) \tag{12}$$

The formula (11) is equivalent to a transition line in the butterfly unit 112 from D[0] to the node 1121. The formula (12) is equivalent to a transition line in the butterfly unit 112 from D[1] to the node 1122.

The third butterfly instruction directs the DCT circuit to finish calculation of formulae (3) and (4). That is, the third butterfly instruction is to realize:

$$D[0]'=t3+t1; \text{ and} \tag{13}$$

$$D[1]'=t2-t4. \tag{14}$$

The formula (13) is equivalent to the node 1121 in the butterfly unit 112. The formula (14) is equivalent to the node 1122 in the butterfly unit 112.

Control information on operands retrieval is also included in the butterfly instructions. With reference to FIGS. 5-8, exemplary operation of the DCT circuit 200 is described. Connections between components of the DCT circuit 200 may comprises buses, and data carried by a bus is shown along with the bus. Buses in the DCT circuit have enough bandwidth to transmit such data in one specified clock cycle. Connection for control signals is not shown in these FIGS. 5-8. Each MUX in the memory stage 302 selects and outputs values from one optional input according to decoded instructions.

3.1 The j-th Clock Cycle:

3.1.1 In the Fetch Stage

In a j-th clock cycle, where j is an integer, when the DCT circuit 200 is to perform the butterfly unit 112 on the matrix C, the control unit 261 in the fetch stage 301 receives and decodes the first butterfly instruction in a j-th clock cycle to control the stages 302 and 303 accordingly in subsequent clock cycles.

3.2 The (j+1)-th Clock Cycle:

3.2.1 In the Memory Stage

Figure 5:
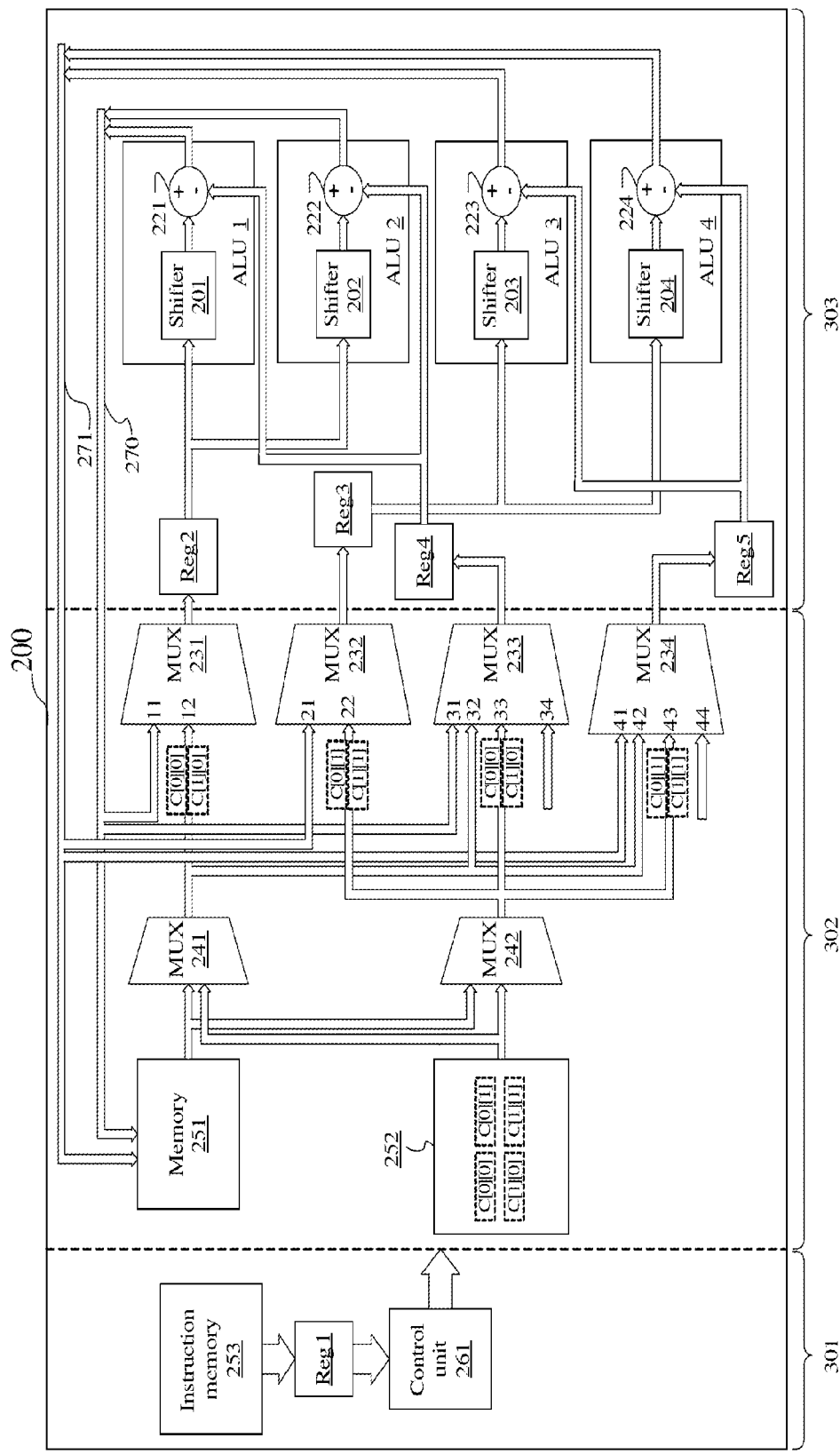
FIG. 5 is a schematic diagram showing operation of the DCT circuit in a (j+1)-th cycle.

With reference to FIG. 5, in a (j+1)-th clock cycle, the memory stage 302 prepares sets of data for the registers Reg2-Reg5 in the arithmetic stage 303 according to two instances of the first butterfly instruction, where the two instances of the first butterfly instruction respectively are applied on the first and second rows of the matrix C as operands. As shown in FIG. 5, image data coefficients C[0][0] and C[1][0] are read from the data memory 252 and transmitted to the optional input 12 of the MUX 231 and the optional input 33 of the MUX 233, and image data coefficients C[0][1] and C[1][1] are read from the data memory 252 and transmitted to the optional input 22 of the MUX 232 and the optional input 43 of the MUX 234.

3.2.2 In the fetch stage

The control unit 261 in the fetch stage 301 receives and decodes the second butterfly instruction in the same clock cycle.

Figure 6:
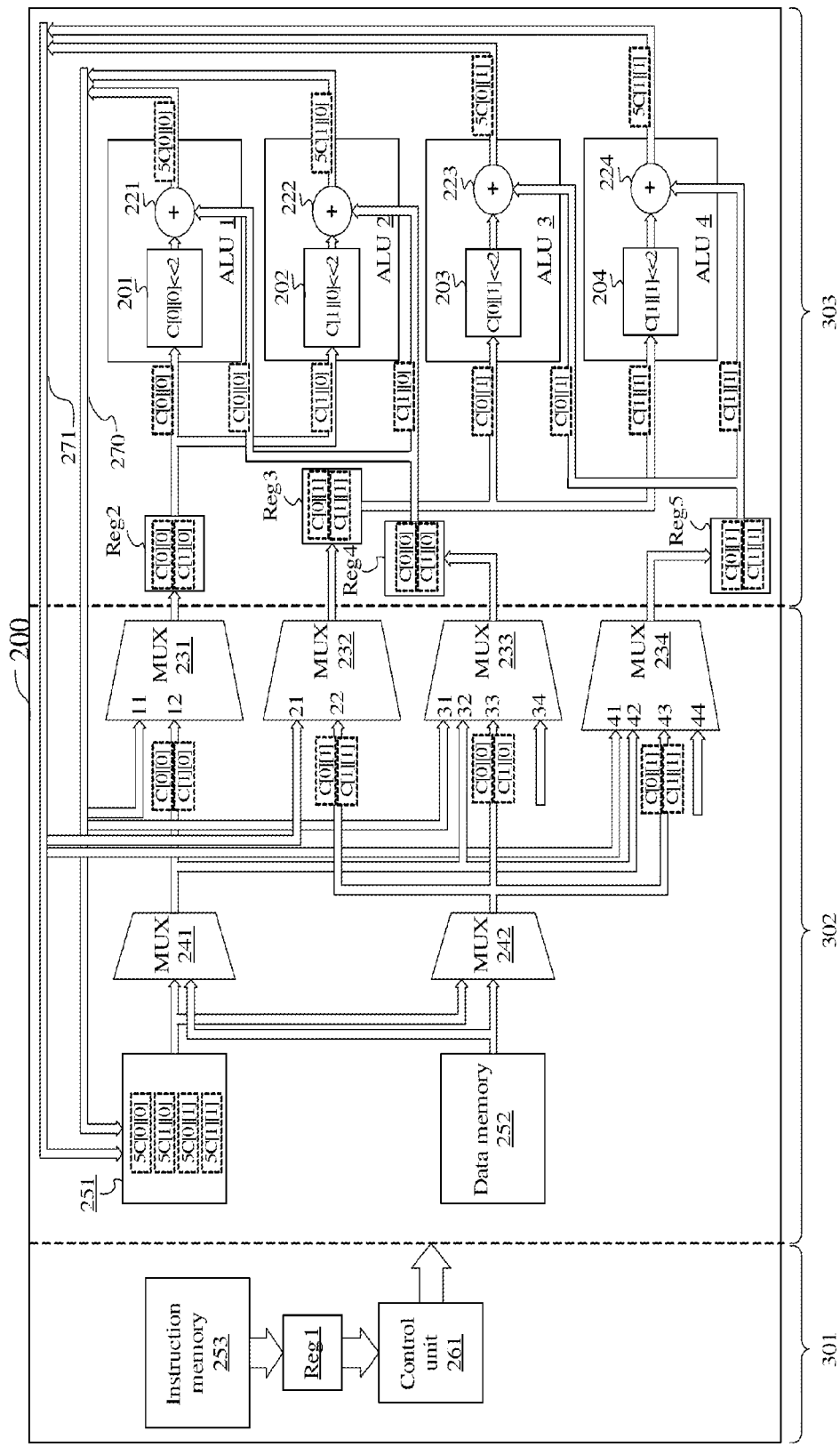
FIG. 6 is a schematic diagram showing operation of the DCT circuit in a (j+2)-th cycle.

3.3 The (j+2)-th Clock Cycle:

With reference to FIG. 6, operations in the three stages in the (j+2)-th clock cycle are detailed.

3.3.1 In the Arithmetic Stage

Each register in the arithmetic stage 303 receives the corresponding set of data from a corresponding MUX in the previous stage and provided the same to ALUs 1~4 through connections. Each ALU receives two input values as operands from the set of data in the registers. As shown in FIG. 6, values input to each ALU are shown beside the corresponding ALU. A value close to a connection to a barrel shifter or an adder/subtractor is directed by the connection to the barrel shifter or the adder/subtractor as input thereof. For example, a shifter 201 and an adder/subtractor 221 respectively receiver an instance of C[0][0] as an input operand.

According to the first butterfly instruction on the first row of the matrix C, the ALU 1 implements calculation of formula (10) with input value C[0][0] substituted for D[0] and outputs 5C[0][0], and ALU 3 implements calculation of formula (9) with input value C[0][1] substituted for D[1] and outputs 5C[0][1]. The operation of t ALU 1 in the clock cycle realize an edge of the butterfly unit 112 connecting D[0] to the node 1122. Specifically, the barrel shifter and adder/subtractor in each ALU respectively perform shift operations and additions/subtractions in the corresponding formula. For example, when the ALU 1 implements calculation of formula (10) with C[0][0] substituted for D[0], a barrel shifter 201 in the ALU 1 obtains 4×C[0][0] by left shifting C[0][0] by 2 bits and output the result 4×C[0][0] to an adder/subtractor 221. The adder/subtractor 221 receives and adds two input values, 4×C[0][0] and C[0][0], and outputs 5×C[0][0]. The internal operation of other ALUs may be understood similarly.

According to the first butterfly instruction on the second row of the matrix C, the ALU 2 implements calculation of formula (10) with C[1][0] substituted for D[0] and outputs 5C[1][0], and the ALU 4 implements calculation of formula (9) with C[1][1] substituted for D[1] and outputs 5C[1][1]. The output 5C[0][0], 5C[1] and 5C[1][1] are stored in the memory 251 as intermediate calculation data.

The ALUs 1-4 perform the same calculation on different sets of image coefficient data in parallel to realize the architecture of single instruction stream and multiple data streams (SIMD). Note that the DCT circuit is not limited to SIMD. Two of the four ALUs 1-4 can perform one calculation to realize a SIMD architecture while the other two ALUs can perform another calculation to realize another SIMD architecture, thus to realize multiple instruction streams and multiple data stream (MIMD) architecture.

3.3.2 In the Memory Stage

With reference to FIG. 6, in a (j+2)-th clock cycle, the memory stage provides other sets of data for entering the registers in the arithmetic stage according to two instances of the second butterfly instruction which are to be respectively applied on the first and second rows of the matrix C as operands. As shown in FIG. 6, image data coefficients C[0][0] and C[1][0] are read from the memory 252 and transmitted to the optional input 12 of MUX 231 and the optional input 33 of MUX 233, and image data coefficients C[0][1] and C[1][1] are read from the memory 252 and transmitted to the optional input 22 of MUX 232 and the optional input 43 of MUX 234.

3.3.3 In the Fetch Stage

The control unit 261 in the fetch stage 301 receives and decodes the third butterfly instruction in the same clock cycle.

Figure 7:
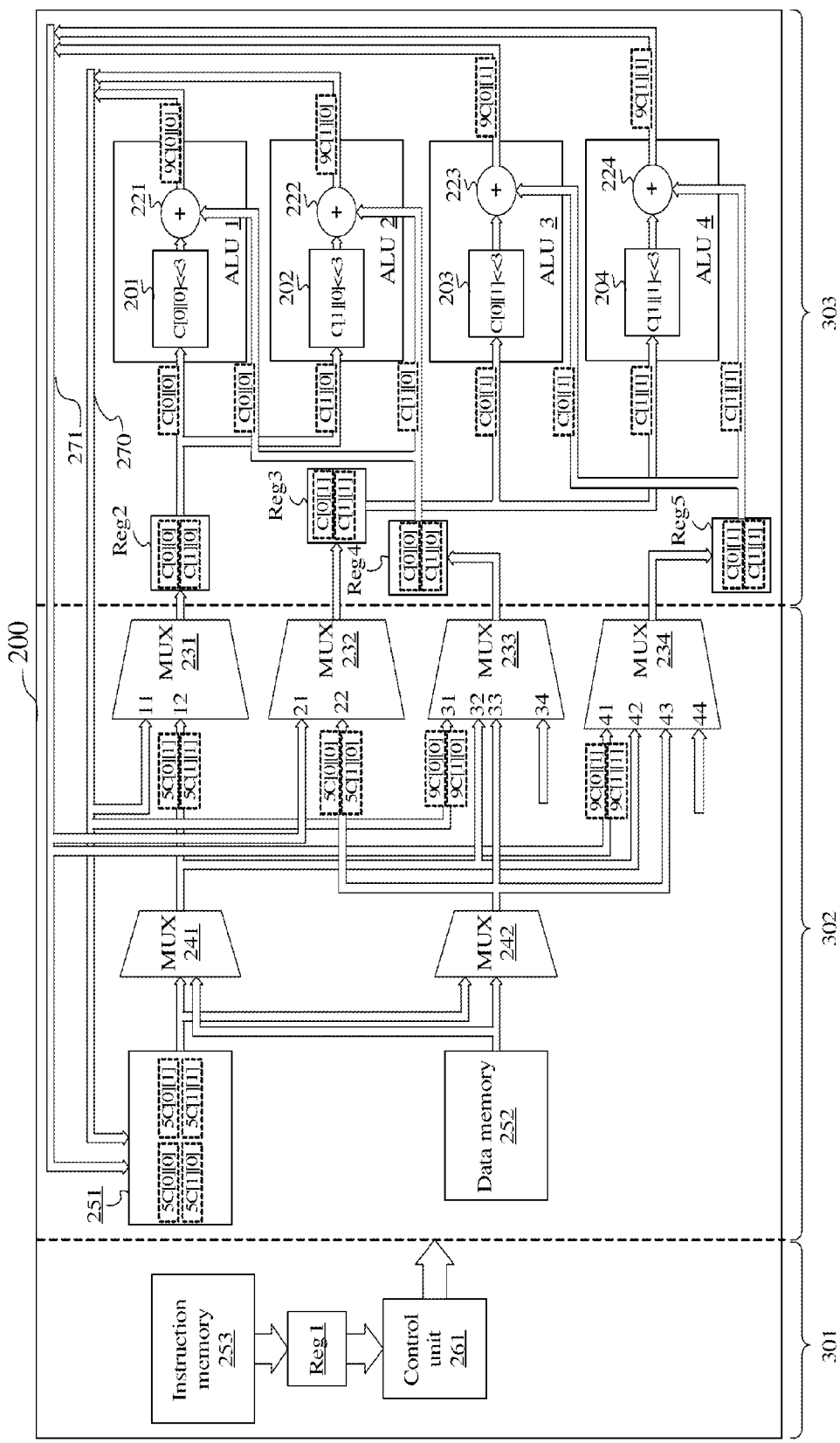
FIG. 7 is a schematic diagram showing operation of the DCT circuit in a (j+3)-th cycle.

3.4 The (j+3)-th Clock Cycle:

With reference to FIG. 7, operations in the three stages in the (j+3)-th clock cycle are detailed.

3.4.1 In the Arithmetic Stage

According to an instance of the second butterfly instruction on the first row of the matrix C, the ALU 1 implements calculation of formula (11) with C[0][0] substituted for D[0] and outputs 9C[0][0], and the ALU 3 implements calculation of formula (12) with C[0][1] substituted for D[1] and outputs 9C[0][1]. According to the other instance of the second butterfly instruction on the second row of the matrix C, ALU 2 implements calculation of formula (11) with C[1][0] substituted for D[0] and outputs 9C[1][0], and ALU 4 implements calculation of formula (12) with C[1][1] substituted for D[1] and outputs 9C[1][1]. The DCT circuit 200 comprises connection paths 270 and 271 for directing the outputs 9C[0][0], 9C[1][0], 9C[0][1], 9C[1][1] to the previous memory stage in the same (j+3)-th clock cycle. The outputs 9C[0][0], 9C[1][0], 9C[0][1], 9C[1][1], 5C[0][0], 5C[1][0], 5C[0][1], and 5C[1][1] are referred to as intermediate calculation data.

3.4.2 In the Memory Stage

In a (j+3)-th clock cycle, the memory stage 302 provides other sets of data for the registers in the arithmetic stage 303 according to two instances of the third butterfly instruction which are to be respectively applied on the intermediate data. The intermediate data comprises outputs of the ALUs corresponding to the two instances of the first butterfly instructions and outputs of the ALUs corresponding to the two instances of the second butterfly instructions. Note that the outputs of the ALU 1 and ALU 2, i.e. 9C[0][0] and 9C[1][0], are routed to the optional input 31 of the MUX 233 through data forwarding path 270 without storing 9C[0][0] and 9C[1][0] in a memory. The outputs of the ALU 3 and ALU 4, i.e. 9C[0][1] and 9C[1][1], are routed to the optional input 41 of the MUX 234 without storing 9C[0][1] and 9C[1][1] in a memory. Accordingly, the arithmetic stage 330 can selectively retrieve the 9C[0][0], 9C[1][0], 9C[0][1], and 9C[1][1] in the subsequent clock cycle. The stored 5C[0][0] and 5C[1][0] are retrieved from the memory 251 and output to MUX 232, and 5C[0][1] and 5C[1][1] are retrieved from the memory 251 and output to MUX 231.

3.4.3 In the Fetch Stage

The control unit 261 in the fetch stage 301 may receive and decode other butterfly instruction in the (j+3)-th clock cycle.

Figure 8:
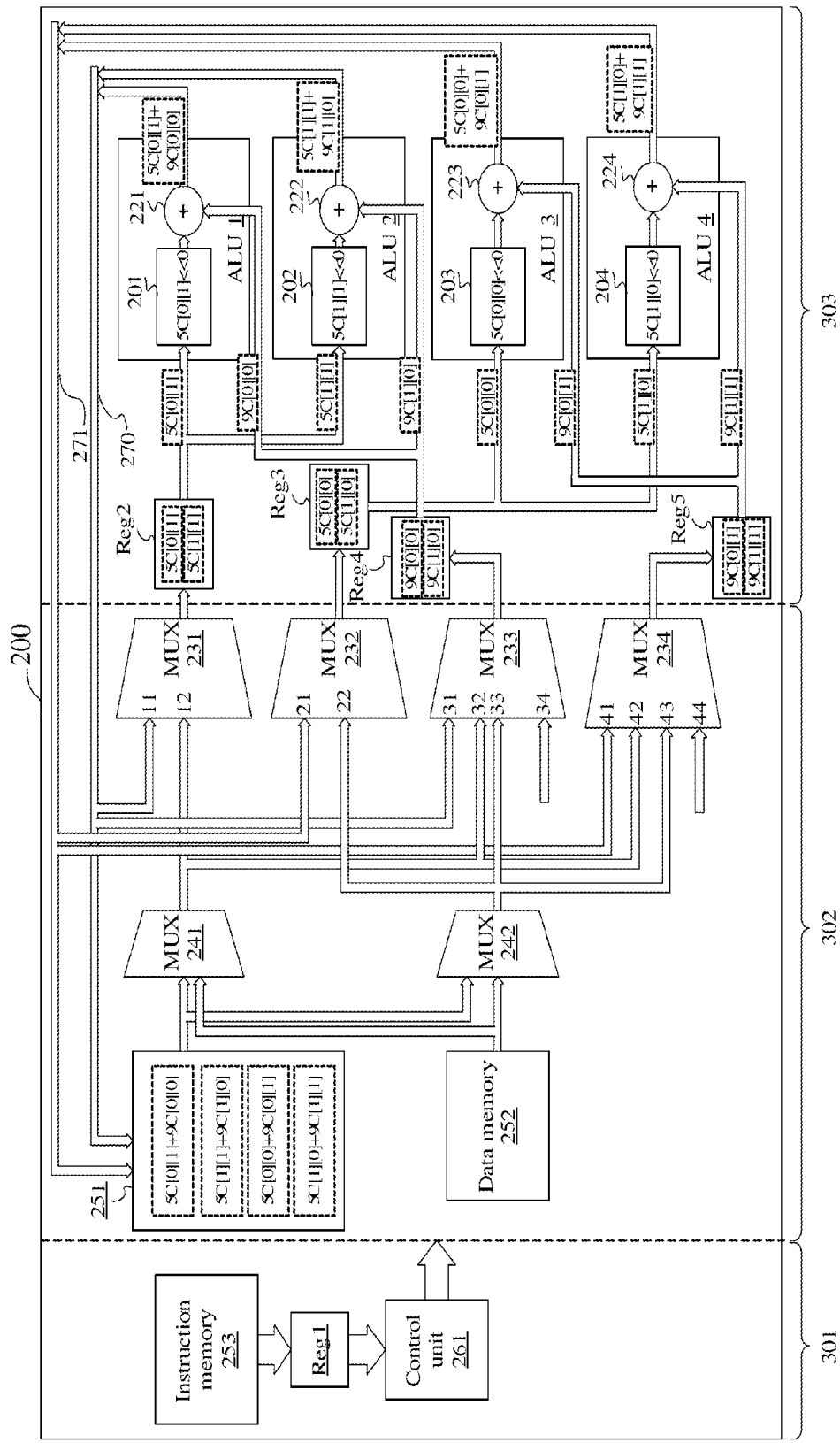
FIG. 8 is a schematic diagram showing operation of the DCT circuit in a (j+4)-th cycle.

3.5 The (j+4)-th Clock Cycle:

With reference to FIG. 8, operation in the arithmetic stage in the (j+4)-th clock cycle is detailed.

3.5.1 In the Arithmetic Stage

According to an instance of the third butterfly instruction on intermediate calculation data corresponding to the first row of the matrix C, the ALU 1 implements calculation of formula (13) with 5C[0][1] substituted for t3, and 9C[0][0] substituted for t1 and outputs 5C[0][1]+9C[0][0], which is equal to formula (5), and ALU 3 implements calculation of formula (14) with 5C[0][0] substituted for t2, and 9C[0][1] substituted for t4 and outputs 5C[0][0]−9C[0][1], which is equal to formula (7).

According to an instance of the third butterfly instruction on intermediate calculation data corresponding to the second row of the matrix C, ALU 2 implements calculation of formula (13) with 5C[1][1] substituted for t3, and 9C[1][0] substituted for t1 and outputs 5C[1][1]+9C[1][0], which is equal to formula (6), and ALU 4 implements calculation of formula (14) with 5C[1][0] substituted for t2, and 9C[1][1] substituted for t4 and outputs 5C[1][0]−9C[1][1], which is equal to formula (8). Accordingly, the DCT circuit can execute the three butterfly instructions to apply the butterfly unit 112 on the matrix C.

Note that eight different values 5C[0][0], 5C[0][1], 5C[1][0], 5C[1][1], 9C[0][0], 9C[0][1], 9C[1][0], and 9C[1][1] are input to the ALUs 1-4 in the (j+4)-th clock cycle. Among the eight values, four values are retrieved from the memory 251, and the other values are forwarded from the ALUs 1-4 through the paths 270 and 271. The memories 251 and 252 may respectively be designed to have two ports, and the bandwidth of each port affords transmission of one of the eight values. Thus, the memories in the memory stage are not required to have four ports to simultaneously provide eight values to the four ALUs.

4. Variations

Figure 9A:
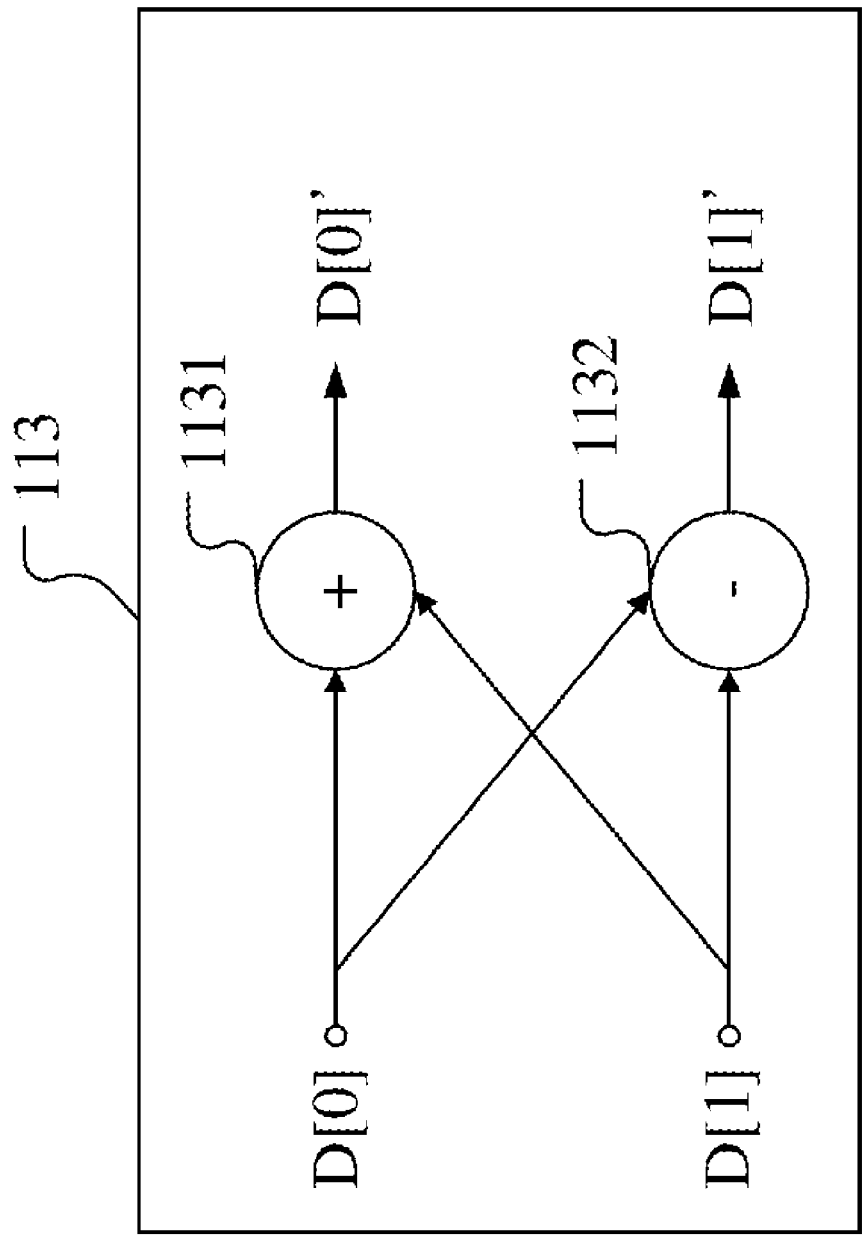

FIGS. 9A-9E show various examples of butterfly units. With reference to FIG. 9A, since no constant value multiplier exists in a butterfly unit 113, operation corresponding to a node 1131 or 1132 can be realized and finished through one clock operation of one of the ALUs 1-4.

Figure 9B:
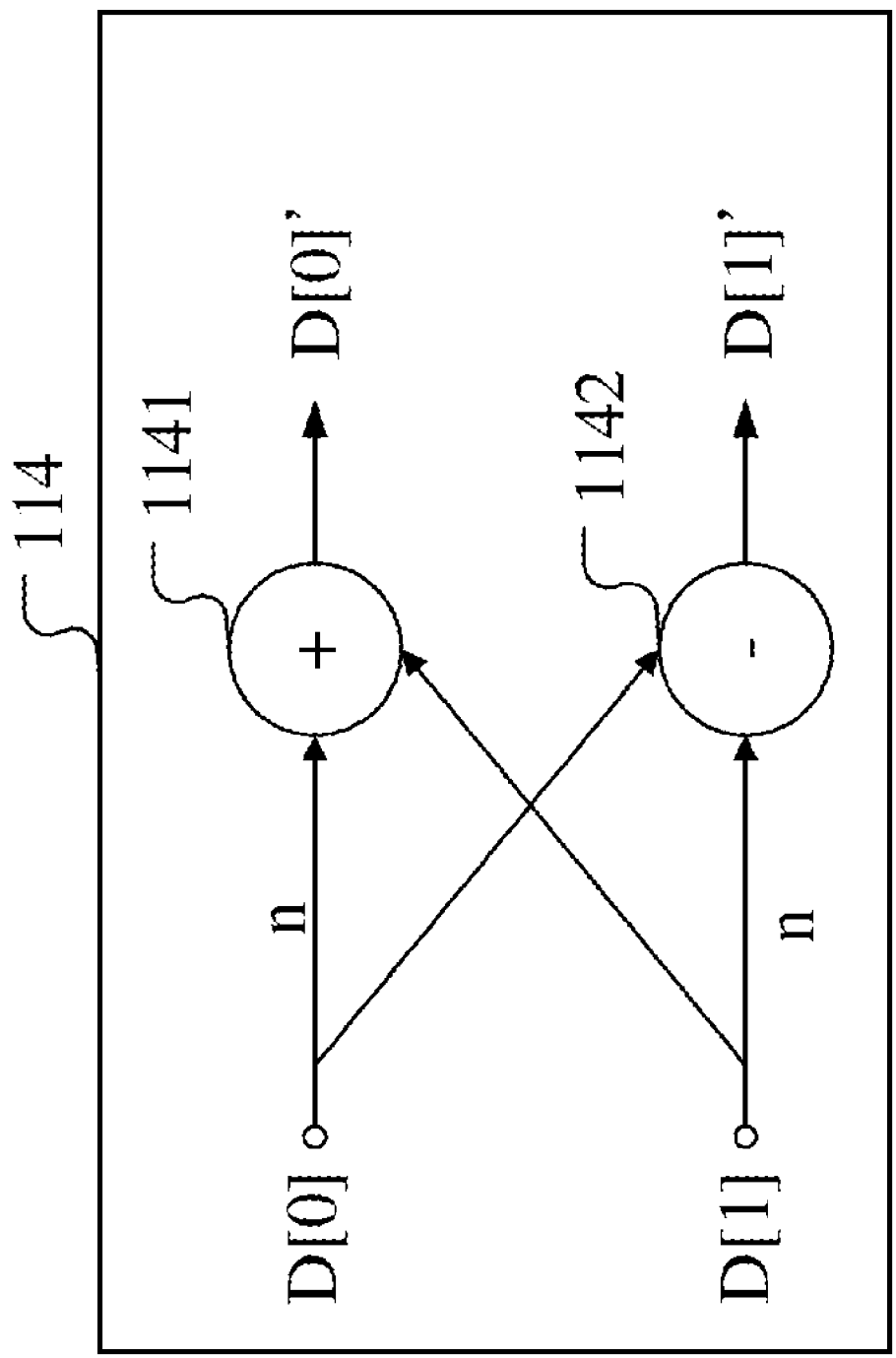

With reference to FIG. 9B, a constant value n exists along a horizontal transition line from node D[0] to a node 1141 and a horizontal transition line from node D[1] to a node 1142. If value n is a power k of integer 2 or fraction ½ (i.e. $n=2^k$ or $n=(½)^k$), where k is also an integer, operation represented by each of the transition line from node D[0] to a node 1141 and the transition line from node D[1] to a node 1142 can be carried out by arithmetic bit shift by a barrel shifter. An adder can finish addition represented by one of the node 1141 and node 1142. Thus, operation corresponding to each of nodes 1141 and 1142 and transition lines associated with the node can be realized and finished through one clock operation of one of the ALUs 1-4.

Figure 9C:
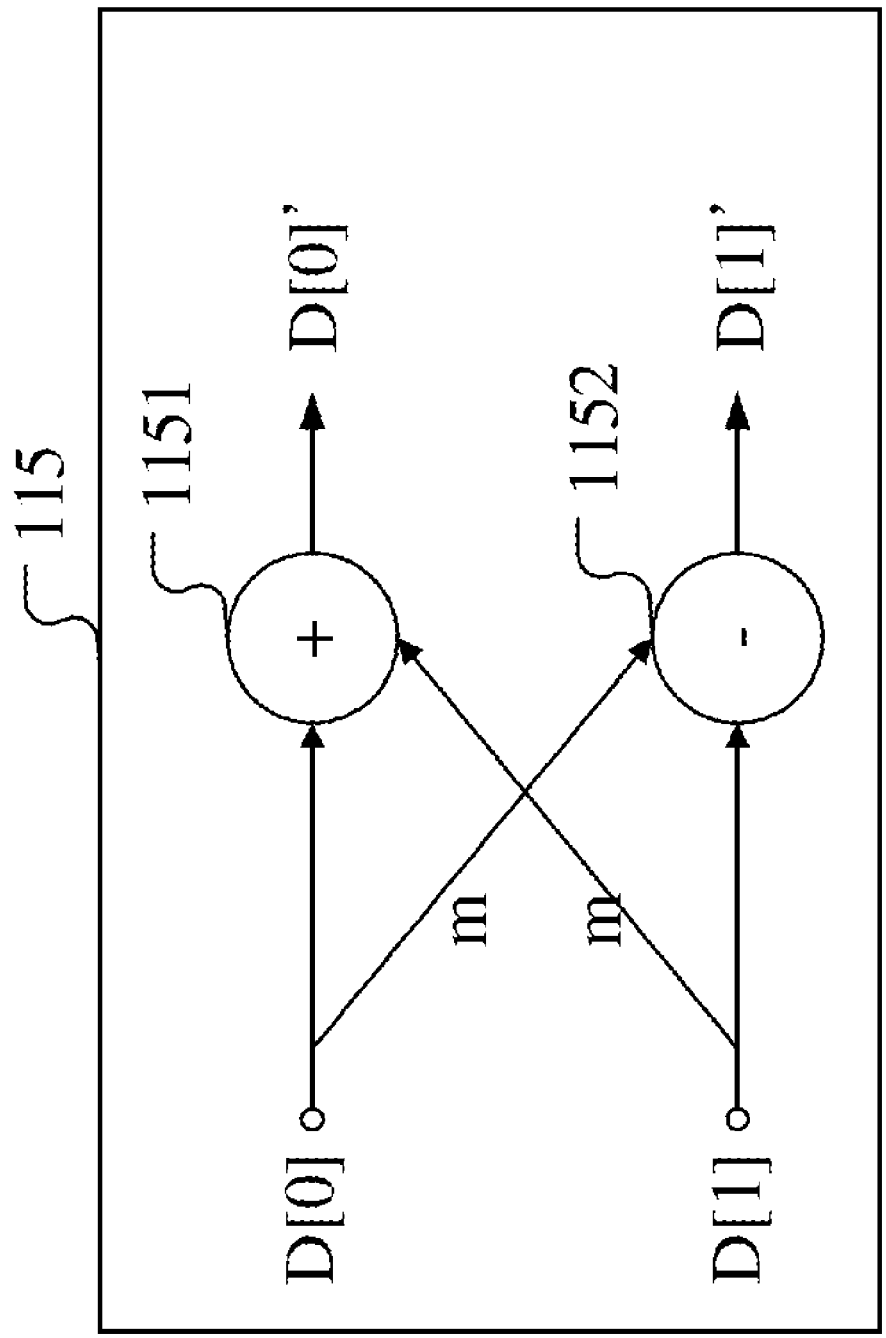

Similarly, in FIG. 9C, if value m is a power f of integer 2 or fraction ½ (i.e. $m=2^f$ or $m=(½)^f$), where f is also an integer, operation represented by each of the transition line from node D[0] to a node 1152 and the transition line from node D[1] to a node 1151 can be carried out by arithmetic bit shift by a barrel shifter. In a first case that the value n or m is not a power of integer 2 or fraction ½, operation represented by each of the horizontal transition line may require operation of more clock cycles of one or more ALUs in the DCT circuit 200. Butterfly instructions in the instruction memory 253 is well organized to direct the DCT circuit 200 to perform operation of a transition line associated with a constant multiplier n or m prior to operation of a transition line not associated with a constant multiplier in the first case.

With reference to FIG. 9D, if values n and m are respectively powers of integer 2 or fraction ½, operation represented by any transition line to a node 1161 can be carried out by arithmetic bit shift by a barrel shifter. Operation represented by the other transition line to the node 1161 can be carried out by one clock operation of one of the ALUs 1-4. Thus, operation corresponding to the node 1161 and transition lines associated with the node 1161 can be finished through two clock operations of one of the ALUs 1-4. Operation corresponding to a node 1162 can be similarly understood.

Alternatively, in a second case that n is a power of integer 2 or fraction ½, and m is different from a power of integer 2 by 1 or different from a power of fraction ½ by 1 (i.e. $m=2^f \pm 1$ or $m=(½)^f \pm 1$), operation corresponding to the node 1161 and transition lines associated with the node 1161 can still be finished through two clock operations of one of the ALUs 1-4 in condition that the ALU executes the operation corresponding to the transition line associated with m before executing the operation corresponding to the transition line associated with n. Butterfly instructions in the instruction memory 253 is well organized to direct the DCT circuit 200 to perform operation associated with m prior to operation associated with n in the second case.

Figure 10:
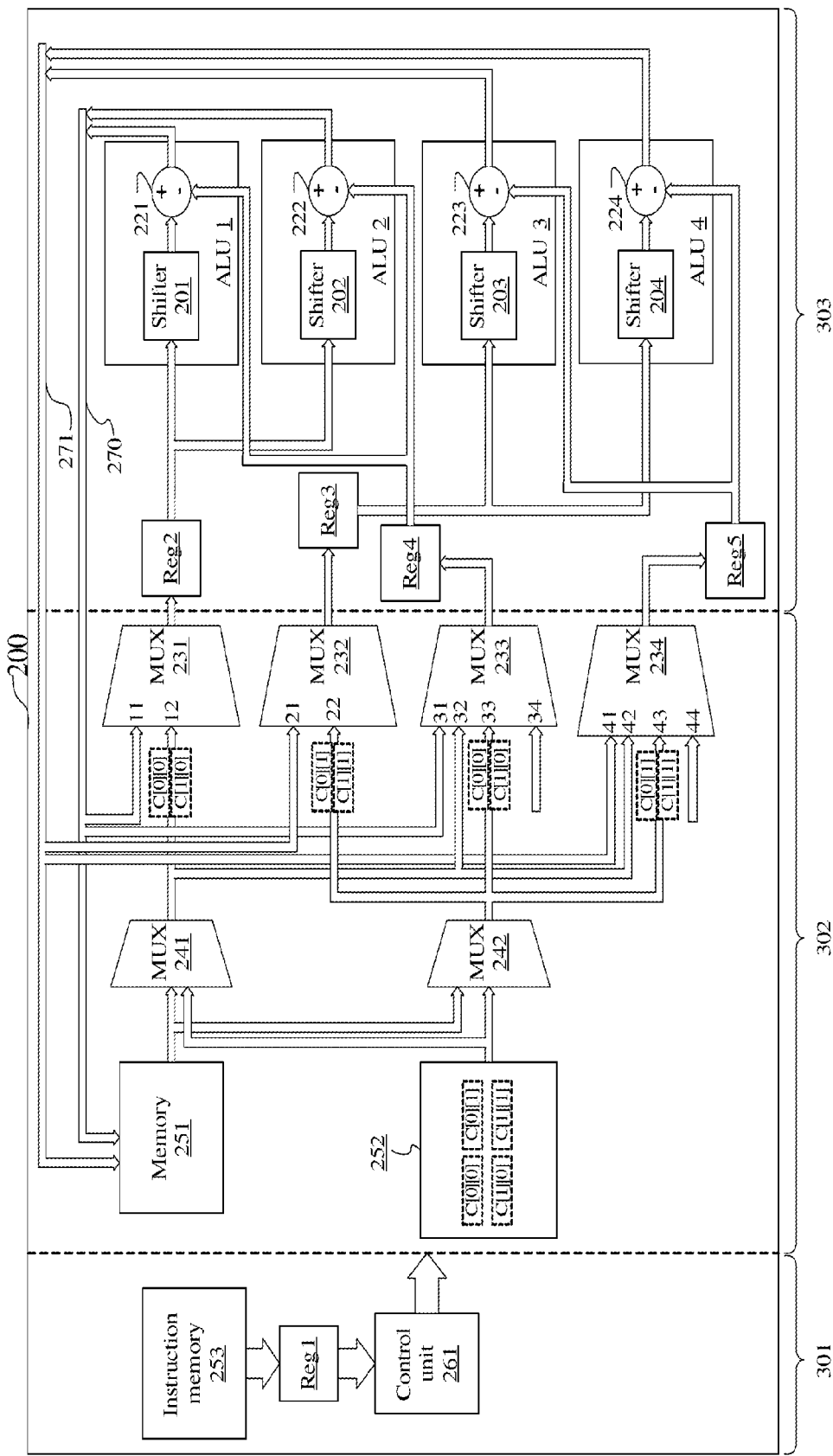
FIGS. 10-12 are schematic diagrams showing execution of a butterfly unit by the DCT circuit on a matrix in three consecutive clock cycles.
Figure 11:
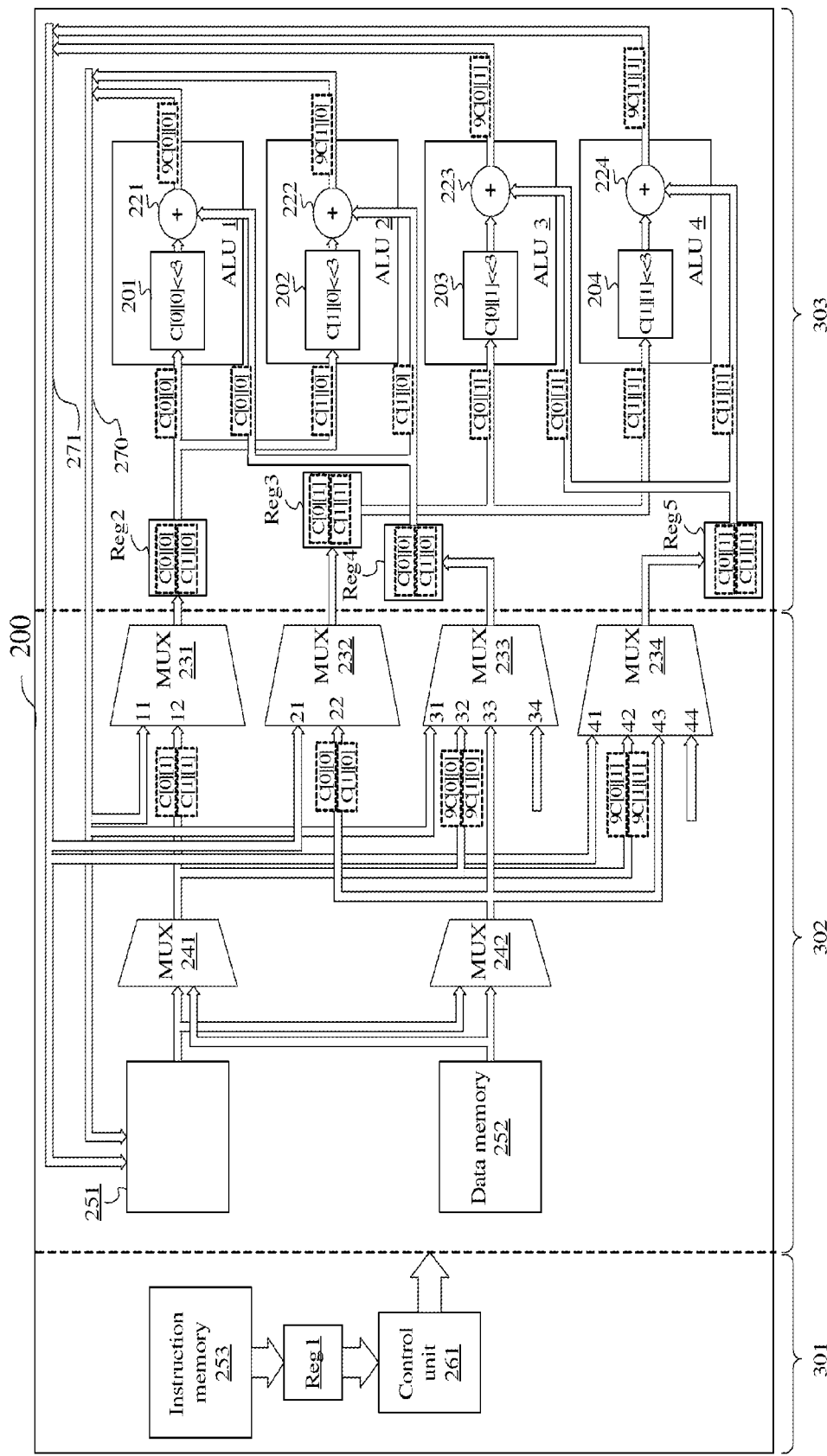
Figure 12:
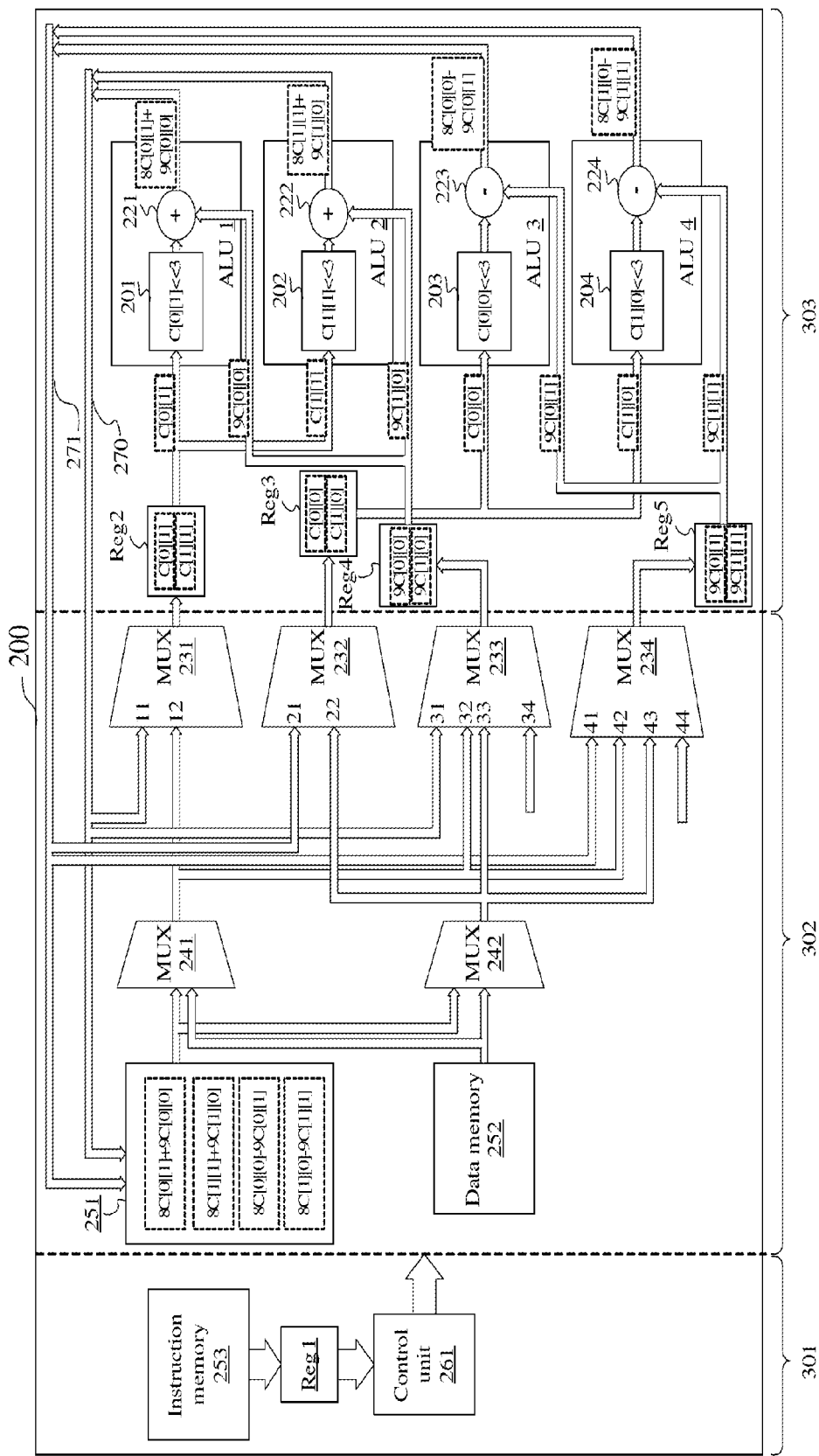

Similarly, in a third case that m is a power of integer 2 or fraction ½, and n is different from a power of integer 2 by 1 or different from a power of fraction ½ by 1 (i.e. $n=2^k \pm 1$ or $n=(½)^k \pm 1$), operation corresponding to the node 1161 and transition lines associated with the node 1161 can still be finished through two clock operations of one of the ALUs 1-4 in condition that the ALU executes the operation corresponding to the transition line associated with n before executing the operation corresponding to the transition line associated with m. Butterfly instructions in the instruction memory 253 is well organized to direct the DCT circuit 200 to perform operation associated with n prior to operation associated with m in the third case. The conditions in the second and third cases can be also applied to the node 1162 and the transition lines associated with the node 1162. Exemplary operations are given with reference to a butterfly unit 117 in FIG. 9E. FIGS. 10-12 shows execution of a butterfly unit 117 by the DCT circuit 200 on the matrix C in three consecutive clock cycles.

Figure 9E:
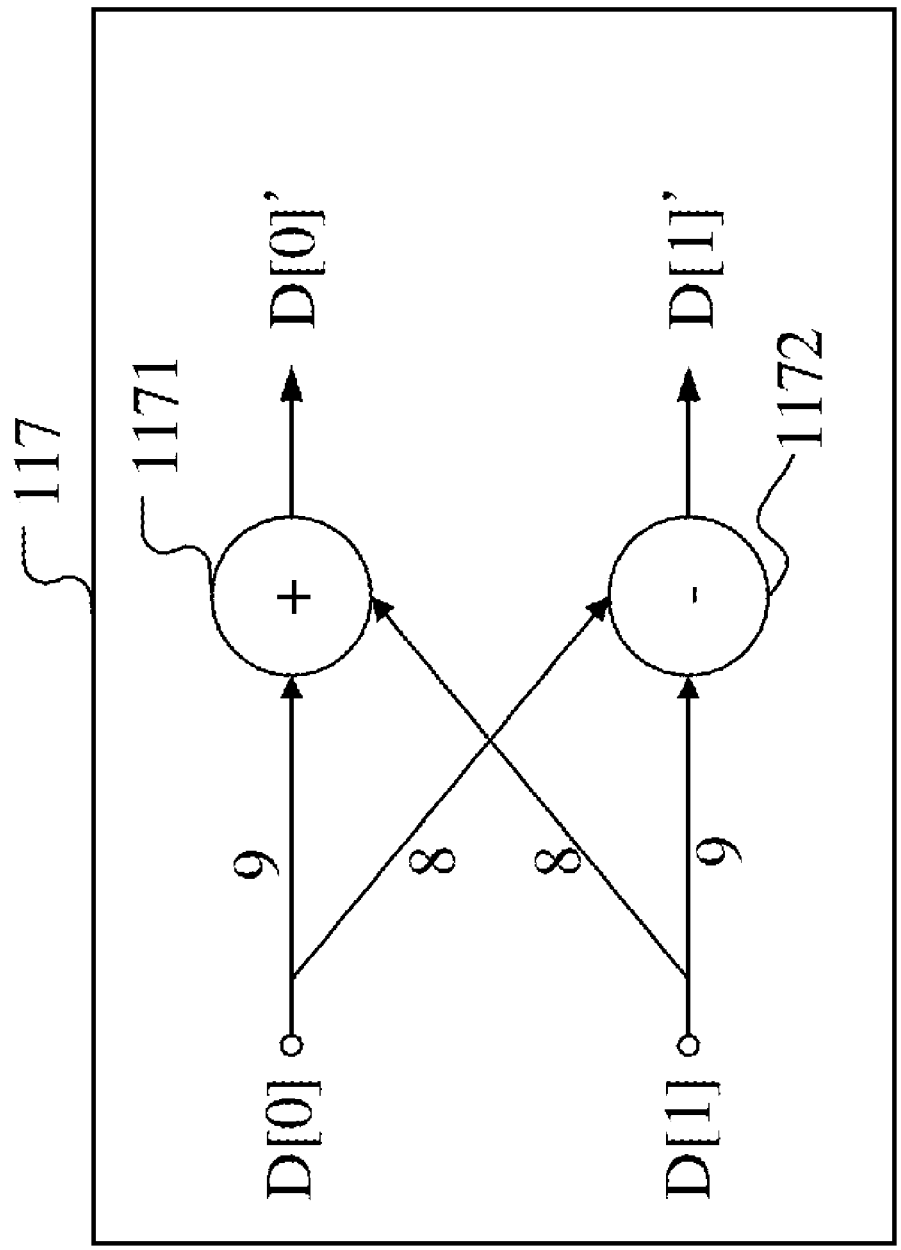

With reference to FIG. 9E, a node 1171 is associated with transition lines 1173 and 1174 which further respectively associate with constant value multiplier 9 and 8, where $9=2^3+1$, and $8=2^3$. As shown in FIGS. 10-12, when the DCT circuit 200 applies row transform on the matrix C utilizing the butterfly unit 117, the ALUs 1-4 execute operations associated with multiplier 9 corresponding to the line 1173 prior to operations associated with multiplier 8 corresponding to the line 1174. Similarly, a node 1172 in the butterfly unit 117 is associated with transition lines 1175 and 1176 which further respectively associate with constant value multiplier 8 and 9, where $8=2^3$, and $9=2^3+1$. As shown in FIGS. 10-12, the ALUs 1-4 execute operations associated with multiplier 9 corresponding to the line 1176 prior to operations associated with multiplier 8 corresponding to the line 1175. Only two cycles of ALU operation are required to implement the butterfly unit 117 on the matrix C.

5. Conclusion

As shown, the image processing device may store various butterfly instructions for implementing various butterfly-structure-based methods for carrying out DCT conforming to various image and video compression standards, such as MPEG2 and H.264. As more instructions for more compression standards are integrated into the instruction memory, the flexibility and standard compatibility of the image processing device 100 is improved. The four ALUs perform different calculations on different sets of image coefficient data in parallel to realize MIMD and improve overall efficiency of the DCT circuit. Additionally, with the aid of the data forwarding paths, memory used in the DCT circuit is not required to provide four ports. To sum up, the proposed DCT circuit suitable for various image processing devices including but not limited to set-top boxes, media players, televisions, and video conference devices.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A discrete cosine transformation circuit comprising:
  a butterfly circuit with a pipeline comprising a fetch stage, a memory stage, and an arithmetic stage, wherein:
  the fetch stage receives and decodes butterfly instructions;
  the memory stage comprises memory repository for storing image data coefficients and intermediate calculated data output by the arithmetic stage, and outputs a first set of data stored in the memory stage in a first clock cycle of the butterfly circuit according to at least one decoded butterfly instruction;
  the arithmetic stage comprises a plurality of registers, a first arithmetic logic unit and a second arithmetic logic unit, the plurality of registers receive the first set of data from the memory repository as input data of the arithmetic stage, and each of the first arithmetic logic unit and the second arithmetic logic unit receives from the plurality of registers a set of input data, performs a first calculation on the set of input data, and outputs a calculation result of the first calculation in a second clock cycle of the butterfly circuit subsequent to the first clock cycle according to at least one decoded butterfly instruction; and
  the butterfly circuit further comprises a path for directing the calculation result of the arithmetic stage to the memory stage in the same clock cycle when the first calculation is performed, such that at least one of the plurality of registers is capable of selectively receiving the calculation result from the path or a subsequent set of data from the memory repository in a third clock cycle subsequent to the second clock cycle.

2. The discrete cosine transformation circuit as claimed in claim 1, wherein the arithmetic stage performs a second calculation on the calculation result and a second set of data from the memory repository in the third clock cycle.

3. The discrete cosine transformation circuit as claimed in claim 1, wherein the memory stage comprises at least one multiplexer by which at least one of the plurality of registers is capable of selectively receiving the calculation result from the path or a subsequent set of data from the memory repository according to at least one decoded butterfly instruction.

4. The discrete cosine transformation circuit as claimed in claim 1, wherein the first and second arithmetic logic units respectively perform a multiplication-equivalent calculation on different data sets, which comprise at least one set of image data coefficients or the calculation result.

5. The discrete cosine transformation circuit as claimed in claim 4, wherein each of the first and second arithmetic logic units comprises a barrel shifter and an adder to realize the multiplication-equivalent calculation.

6. The discrete cosine transformation circuit as claimed in claim 4, wherein the arithmetic stage comprises a third arithmetic logic unit and a fourth arithmetic logic unit for respectively performing another second calculation on different data sets in parallel with the first calculation, and each of the third and fourth arithmetic logic units performs a third calculation based on at least one set of the image data coefficients or the calculation result.

7. The discrete cosine transformation circuit as claimed in claim 1, wherein the arithmetic stage comprises a third arithmetic logic unit and a fourth arithmetic logic unit for respectively performing a third calculation on different data sets in parallel with the first calculation, and each of the third and fourth arithmetic logic units performs a third calculation based on at least one set of the image data coefficients or the calculation result.

8. The discrete cosine transformation circuit as claimed in claim 1, wherein when the arithmetic stage executes a unit of a butterfly-structure-based method comprising multiplication of a first image coefficient by a first constant value, multiplication of a second image coefficient by a second constant value, and summation of the results of the two multiplication, the arithmetic stage executes the multiplication of the first image coefficient prior to the multiplication of the second image coefficient when the first constant value is different from a power of integer 2 or fraction ½ by 1, and the second constant value is a power of integer 2 or fraction ½.

9. An image processing device comprising:
a discrete cosine transformation circuit with a pipeline comprising a fetch stage, a memory stage, and an arithmetic stage, wherein:
the fetch stage receives and decodes butterfly instructions;
the memory stage comprises memory repository for storing image data coefficients and intermediate calculated data output by the arithmetic stage, and outputs a first set of data stored in the memory stage in a first clock cycle of the butterfly circuit according to at least one decoded butterfly instruction;
the arithmetic stage comprises a plurality of registers, a first arithmetic logic unit and a second arithmetic logic unit, the plurality of registers receive the first set of data from the memory repository as input data of the arithmetic stage, and each of the first arithmetic logic unit and the second arithmetic logic unit receives from the plurality of registers a set of input data, performs a first calculation on the set of input data, and outputs a calculation result of the first calculation in a second clock cycle subsequent to the first clock cycle according to at least one decoded butterfly instruction; and
the butterfly circuit further comprises a path for directing the calculation result of the arithmetic stage to the memory stage in the same clock cycle when the first calculation is performed, such that at least one of the plurality of registers is capable of selectively receiving the calculation result from the path or a subsequent set of data from the memory repository in a third clock cycle subsequent to the second clock cycle.

10. The image processing device as claimed in claim 9, wherein the arithmetic stage performs a second calculation on the calculation result and a second set of data from the memory repository in the third clock cycle.

11. The image processing device as claimed in claim 9, wherein the memory stage comprises at least one multiplexer by which at least one of the plurality of registers is capable of selectively receiving the calculation result from the path or a subsequent set of data from the memory repository according to at least one decoded butterfly instruction.

12. The image processing device as claimed in claim 9, wherein the first and second arithmetic logic units respectively perform a multiplication-equivalent calculation on different data sets, which comprise at least one set of image data coefficients or the calculation result.

13. The image processing device as claimed in claim 12, wherein each of the first and second arithmetic logic units comprises a barrel shifter and an adder to realize the multiplication-equivalent calculation.

14. The image processing device as claimed in claim 12, wherein the arithmetic stage comprises a third arithmetic logic unit and a fourth arithmetic logic unit for respectively performing another second calculation on different data sets in parallel with the first calculation, and each of the third and fourth arithmetic logic units performs a third calculation based on at least one set of the image data coefficients or the calculation result.

15. The image processing device as claimed in claim 9, wherein the arithmetic stage comprises a third arithmetic logic unit and a fourth arithmetic logic unit for respectively performing a third calculation on different data sets in parallel with the first calculation, and each of the third and fourth arithmetic logic units performs a third calculation based on at least one set of the image data coefficients or the calculation result.

16. The image processing device as claimed in claim 9, wherein when the arithmetic stage executes a unit of a butterfly-structure-based method comprising multiplication of a first image coefficient by a first constant value, multiplication of a second image coefficient by a second constant value, and summation of the results of the two multiplications, the arithmetic stage executes the multiplication of the first image coefficient prior to the multiplication of the second image coefficient in condition that the first constant value is different from a power of integer 2 or fraction ½ by 1, and the second constant value is a power of integer 2 or fraction ½.

17. The image processing device as claimed in claim 9, wherein the image processing device comprises a set-top box.

* * * * *